United States Patent [19]
Grantham

[11] 3,938,149
[45] Feb. 10, 1976

[54] FREQUENCY SCAN RADAR SYSTEM WITH PROVISION FOR INTERFERENCE ELIMINATION

[75] Inventor: George William Grantham, West Covina, Calif.

[73] Assignee: International Telephone & Telegraph Corporation, New York, N.Y.

[22] Filed: Jan. 19, 1967

[21] Appl. No.: 611,538

[52] U.S. Cl............................................. 343/17.1 R
[51] Int. Cl.² .......................................... G01S 7/28
[58] Field of Search............. 343/17.2, 5 DP, 12 SB, 343/17.1, 16

Primary Examiner—Malcolm F. Hubler
Attorney, Agent, or Firm—William T. O'Neil

[57] ABSTRACT

A frequency scan radar system is provided which scans in groups of nine contemporaneous beams which partially overlap in angular coverage in the plane of scan, such that any given target is illuminated by at least two of the beams. Receiving means separates echoes according to frequency (which relates to angle) in nine corresponding channels. Logic circuitry is employed to determine presence of signal in one or more channels. Bona fide echo signals occur in not less than two adjacent channels, whereas limited spectrum interference or jamming signals occur in only one channel. Video blanking means are controlled to blank out video corresponding to such single beam reception.

6 Claims, 1 Drawing Figure

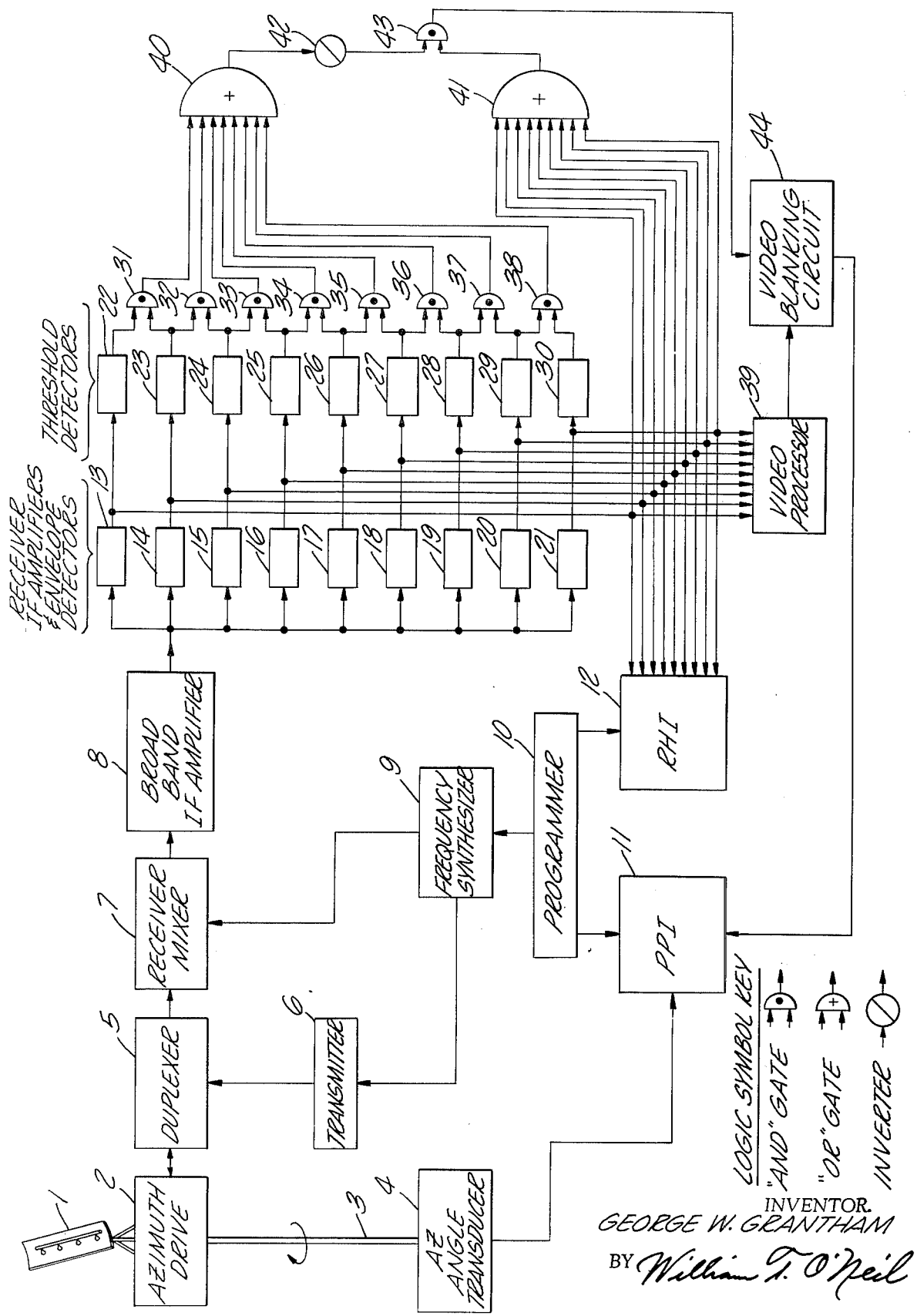

FREQUENCY SCAN RADAR SYSTEM WITH PROVISION FOR INTERFERENCE ELIMINATION

BACKGROUND OF THE INVENTION

1. Field of the Invention

This invention relates to radar systems and more particularly, to the elimination or reduction of the effect of jamming in a frequency scan radar system.

2. Description of the Prior Art

In the prior art, various systems have been proposed whereby the inherent frequency sensitivity of certain antenna configurations is employed in conjunction with variable frequency transmitter to effect inertialess scanning. The variable frequency transmitting and receiving characteristic of such systems makes them inherently less susceptible to jamming of the classic type. This is true, not only because of the variable frequency feature, but also because such systems frequently employ pencil-beams which "see" a jammer source much less frequently in their scanning schedule than is the case for fan beam systems such as the prior art conventional Plan Position Indicator radar which radiates a beam wide in the elevation plane to provide unrestricted elevation coverage and narrow in the azimuth plane to provide resolution of targets for the PPI presentation.

Nevertheless, more sophisticated jamming techniques can be employed which tend to limit the usefulness of even the pencil-beam frequency scan radar system in a hostile environment.

A prior art system in respect to the present invention is described in co-pending United States application Ser. No. 599,348 filed Dec. 2, 1966, and assigned to the same assignee as the present invention. In that reference, a system is described which provides a PPI presentation and also a range-height presentation by scanning a pencil-beam in the vertical plane (for example, from the horizon to plus 45°) at a rapid rate while the entire antenna system is being rotated in the azimuth plane throughout an angle such as 360°. The present invention is a system improvement, particularly adaptable to the aforementioned frequency-scan system.

Another prior art frequency scan radar system to which the present invention is generally applicable is described in U.S. Pat. No. 3,039,097.

SUMMARY

The present invention provides a method and instrumentation particularly adapted to the type of pulsed frequency scan radar system described in detail in U.S. patent application Ser. No. 599,348 filed Dec. 2, 1966, for rejecting extraneous received pulses, including pulses of jamming energy. The system employs multibeam scanning within the duration of each transmitted pulse, normally through a vertical angle. A frequency sensitive antenna (i.e., one which radiates in a direction which is a function of frequency of excitation) is fed by pulses of electromagnetic energy varying in N discrete steps throughout each of said pulses (where N is 9, for example). These discrete frequency steps are such that N partially overlapping beams are transmitted during each of the said pulses.

The next group of N overlapping beams and the following groups are also each generated by N discrete steps within the corresponding transmitted pulse, the entire group of frequencies corresponding to each succeeding group of beams being shifted so that each succeeding group of overlapping beams is displaced in the vertical plane. A sufficient number of such beam groups are successively generated to cover the vertical scan sector of interest.

The frequency scanning in the vertical plane goes on while the azimuth scan proceeds by (for example) mechanical rotation of the array. The rate is such that, during each vertical (frequency) scan cycle, the rotational movement of the array in azimuth is negligibly small.

Received echoes are separated on a frequency basis, since each individual beam corresponds to its own discrete frequency, and this fundamental property makes it possible to identify interfering or jamming signals having comparatively limited spectral width.

Beam shapes and frequency spacing being such that there is appreciable overlap, normal target responses are received on two or three adjacent beams as a result of illumination by as many adjacent beams.

To implement the identification of interfering or jamming pulses, use is made of the fact that such pulses, unlike received echoes, are received on one beam (i.e., one frequency channel).

Since the received energy is separated by beam within each group in a corresponding number of receiver channels, logic circuits are applicable to the separated video to differentiate between legitimate echo signals and interfering signals.

Video from the N receiver channels is applied to N threshold detectors which provide N outputs each of standard amplitude and each responsive to a predetermined minimum signal amplitude. A logical comparison is made between adjacent threshold detector outputs and the outputs of that comparison are present when and only when two adjacent channels have signal. An additional comparison is also made between the results of the previous comparison and the sum of the individual channel standardized signals. The results of these two comparisons then provides the basis for a third comparison whereby a blanking gate is generated when an interfering signal appears in one channel only and not in an adjacent channel.

Accordingly, it is the general object of the present invention to provide a system for use with an overlapping beam frequency scan radar to allow automatic recognition and elimination of interfering pulses of arbitrary duration but limited spectral width from the normal echo video, without deterioration of the signal and noise characteristic of legitimate echo video signals.

BRIEF DESCRIPTION OF THE DRAWING

A drawing is provided for assistance in the understanding of the present invention. The essential elements of the invention are set forth in block and logical symbol form in a manner readily understandable to those skilled in the art.

DESCRIPTION OF THE PREFERRED EMBODIMENT

Referring now to the drawing, it may be said at the outset that many of the blocks relating to the basic radar systems such as the antenna 1, the transmitter 6, the receiver-mixer 7, the frequency synthesizer 9, the programmer 10, the PPI indicator 11, the RHI indicator 12 and the video processor 39, operate in substantially the manner described in the aforementioned co-pending U.S. application Ser. No. 599,348 filed Dec. 2, 1966, entitled THREE DIMENSIONAL RADAR SYSTEM WITH INTEGRATED PPI PRESENTATION.

Although the present invention is not limited to particular methods of instrumentation of the basic radar system, the following description as related to the drawing may be regarded as describing a typical embodiment.

An antenna array 1 includes a linear disposition of radiating elements stacked vertically and fed by a suitable transmission line such as described in co-pending U.S. patent application Ser. No. 570,991 filed Aug. 8, 1966, entitled PENCIL BEAM FREQUENCY/PHASE SCANNING SYSTEM. Such an array is frequency sensitive and affords inertialess scanning of the beam in the vertical plane as a function of a transmitter frequency. By reciprocity, the reception of received energy is limited to discrete angles in the vertical plane, each angle corresponding to that frequency which is transmitted at the same angle in the transmitting mode. In accordance with well-known design criteria, the radiating element spacing and the total number of elements stacked in such an array, determine the frequency sensitivity, (that is $d\theta/df$) and the width of the beam in the elevation plane. A reflector of generally cylindrical paraboloid shape serves to shape the beam in the azimuth plane so that the result is a relatively sharp pencil-beam in space.

Although other methods of azimuth scan are available to the designer and although the Plan Position Indicator type of operation is not fundamentally necessary for the employment of the present invention, this description will proceed in accordance with the illustration which contemplates 360° continuous rotation of the antenna assembly 1 by an azimuth drive 2. An azimuth angle transducer 4, mechanically coupled to this rotating motion via shaft 3, provides the correlated azimuth scan for the PPI indicator 11 in the azimuth plane. Well known servo follow-up techniques are applicable to this part of the structure.

Frequency synthesizer 9 provides the necessary discrete frequency steps which are suitably multiplied and power amplified in the transmitter 6 and fed to the antenna assembly 1 through the duplexer 5. The frequency steps from the frequency synthesizer 9 are such that each discrete successive transmitted beam overlaps the adjacent preceding and succeeding beams, typically by one-half beamwidth. In a typical practical system in accordance with the present invention these overlapping beams are transmitted in groups of nine during each pulse repetition interval of the system. The pulse time of 27 microseconds for each such pulse repetition interval includes these nine overlapping beams, and nine discrete corresponding frequencies are transmitted for substantially one-ninth of the 27 microsecond pulse ontime for each period. The frequency synthesizer 9 also provides a contemporaneous local oscillator signal to the receiver mixer 7 which is capable of receiving for the full non-redundant ranging period between successive transmitted pulses. Duplexer 5 provides the normal transmit-receive switching which is well known in the radar art.

The programmer 10 functions as the system synchronizer or "clock" and in addition to programming the frequency synthesizer 9 also synchronizes the PPI indicator 11 and the RHI (Range-height Indicator) 12.

The transmitter 6 includes active microwave components such as traveling wave tubes and/or amplitrons and their associated hardware, typically and more fully described in the previously referenced co-pending U.S. patent applications.

Echo signals received by the antenna 1 between the said transmitted pulses pass through the receiver-mixer 7 and a broadband IF amplifier 8, which is capable of accepting the full range of frequencies corresponding to the said 9 transmitted beams within each transmitter pulse.

Receiver IF amplifiers and envelope detectors 13 through 21 function as narrow band IF amplifiers, capable of singling out the 9 discrete frequencies aforementioned. Since the programmer 10 is capable of instructing the RHI 12 in respect to the expected vertical angle position of each echo the nine output signals of these receiver IF amplifiers and envelope detectors constitute the range height information video which is provided directly to the RHI.

It will be noted that video processor 39 also receives the 9 outputs of the said receiver IF amplifiers and envelope detectors. The function of the said video processor 39 is the addition of all the range height video within each cycle of vertical (frequency) scan.

Since the vertical plane frequency scanning is rapid compared to the mechanical rotation and corresponding azimuth scan, the rotational movement of said antenna 1 in azimuth is negligibly small during any one elevation scan cycle. Accordingly, the video processor 39, by adding the said range height video signals, performs the function of "collapsing" the range height video in order to afford a PPI presentation which takes full advantage of the echo signals available at all elevations for inclusion in the PPI presentation.

The operation of the video processor 39 is also described in detail in the aforementioned co-pending U.S. patent application Ser. No. 599,348 filed Dec. 2, 1966. Thus it will be understood that the output of the video processor 39 to the video blanking circuit 44 constitutes the PPI video.

Referring again to the outputs of the receiver IF amplifiers and envelope detectors 13 through 21 inclusive, it will be noted that these outputs are individually fed to corresponding threshold detectors 22 through 30. It is the function of these threshold detectors to respond to each video signal of an amplitude exceeding an arbitrarily selected amplitude threshold. Each signal exceeding the said threshold is passed by the said threshold detectors in a standard amplitude form. The amplitude standardization is desirable for proper operation of the remaining circuitry which is essentially digital logic instrumentation.

Returning now to the receiver IF amplifiers and envelope detectors 13 through 21, it should be noted that although the 9 discrete frequencies, corresponding to the 9 transmitted beams during each transmitter pulse, occur in rapid succession they are not simultaneous and, accordingly, the blocks 13 through 21 must include delay means in order to effect time alignment of their outputs. These delay means may be either in the video domain after envelope detection, or may be in the IF domain prior to envelope detection. Whatever video echo signals are present in the outputs from 13 through 21, there may also be present in any one of these outputs the video signals corresponding to received jamming or interference pulses of the type aforementioned.

The raw video with interference or jamming pulses present also passes through the threshold detectors 22 through 30. Eight of the AND gates 31 through 38 are disposed to examine the video between successive threshold detectors. That is, AND gate 31 compares the outputs of threshold detectors 21 and 23, AND gate 32 compares video between threshold detectors 23 and 24 etc. For convenience, we shall henceforth refer to the output of the standardized amplitude from blocks 22 through 30 as logic 1 when signals are present in their outputs. Whenever the amplitude of the video into the threshold detectors is below the arbitrary threshold level the output of the threshold detector concerned is then logic 0. The output of any AND gate 31 through 38 will be logic 1, when, and only when, the two inputs to a particular AND gate are both at the logic 1 state. A logic 1 signal from any of the AND gates 31 through 38 will then pass through the OR gate 40 to the inverter 42. Logic 1 output from one or more of the envelope detectors in blocks 13 through 21 by separate connection to the nine input OR gate 41 will also produce a logic 1 output from the said 41. It will be noted that the inputs to AND gate 43 must both be logic 1 to obtain a logic 1 output from 43. (Because of the presence of inverter 42 this corresponds to a logic 0 from 40.) A logic 1 output from 43 therefore exists if, and only if, a signal above threshold exists in one or more channels, but does not exist in any two adjacent channels.

It should be noted that although the signals from blocks 22 through 30 are all of the same standard amplitude, they may vary considerably in duration depending upon the duration of the video echo signals and the jamming or interfering pulses present. Accordingly, the logic outputs of the AND and OR circuits on through to 43 are of variable duration. It will also be noted that when the aforementioned conditions are fulfilled for a logic 1 output from 43 the duration of the signal there corresponds to the duration of the jamming or interfering pulse, which would be expected to be at least as long as a legitimate target echo signal. By supplying the output of the AND gate 43 to a video blanking circuit 44, which is a controllable video switch of suitable bandwidth, the said output 43 is used as a switch control signal which switches off or blanks video from video processor 39 on its way to the PPI indicator 11.

The detailed circuitry necessary to accomplish the individual block and logical functions described and illustrated is known to those skilled in the art.

The threshold detectors 22 through 30 may conveniently be "Schmitt trigger circuits" which are readily adaptable to control of the threshold level at which they will respond. Adjustment of this threshold level low with respect to RMS noise level will produce a high rate of false blanking actuated by noise while providing a high degree of blanking sensitivity to undesired "single beam" signals. A higher threshold level will provide less responsive blanking of the undesired signal but will reduce the false blanking rate. Conventional statistical methods may be employed to compute blanking sensitivity and false alarm rates.

Since the PPI video is a composite of all elevation angles, the loss of data resulting from blanking of a portion of composite signal is minimal.

The instrumentation of the present invention, particularly in the logic circuitry is readily adapted to the use of solid state components and techniques.

Modifications and alterations falling within the spirit and scope of the present invention will suggest themselves to those skilled in the art. Accordingly, it is not intended that the present invention be limited by the illustration or description thereof.

What is claimed is:

1. A pulsed radar system having an antenna for radiating, during each transmitted pulse, N beams of electromagnetic energy each narrow in at least a first plane, said antenna radiating said beams each at an angle in said first plane, which angle is a function of the instantaneous frequency of excitation of said antenna, having transmitting means for providing variable frequency excitation to said antenna in N discrete frequency steps within each of said transmitted pulses, the frequency spacing of said frequency steps being such that adjacent ones of said beams partially overlap in space, receiving means operative in the time between said transmitted pulses, said receiving means having N separate receiver channels corresponding to said N transmitted frequencies, and comprising the combination of: first means for time aligning and adding the outputs to produce a composite signal of at least part of the outputs of said N receiver channels; second means responsive to the outputs of said receiver channels for generating an output whenever at least one of the said outputs of said receiving channels contains a signal; third means for comparing the outputs of said N receiver channels for providing an output signal when signal is present contemporaneously in any two of said receiver channels which correspond to adjacent frequencies; fourth means responsive to the outputs of said second and third means for producing a control signal when a signal is present at the output of said second means but not at the output of said third means; and video switching means responsive to said control signal and connected in series with the output of said first means whereby said composite signal may be interrupted when and so long as said control signal is present in a predetermined condition.

2. The invention set forth in claim 1 further defined in that additional means are included between said N receiver channel outputs and said third means, said additional means comprising N circuits operative to pass only signals having amplitudes in excess of a predetermined level.

3. The invention set forth in claim 1 further defined in that said second means comprises a logical OR circuit and said output from said second means is logic 1 corresponding to the presence of at least one input and logic 0 corresponding to absence of input.

4. The invention set forth in claim 3 further defined in that said third means comprises N—1 two input logical AND gates each producing a logic 1 output corresponding to signal on both of said two inputs and a logic 0 output otherwise, and also comprising, an N—1 input logical OR circuit responsive to said outputs of said aforementioned two input logical AND gates for producing a logic 1 output corresponding to a logic 1 at any of said N—1 inputs and a logic 0 output in the absence of at least one logic 1 input.

5. The invention set forth in claim 4 further defined in that said fourth means comprises an inverter responsive to the output of said third means, said inverter being operative to convert a logic 1 input to a logic 0 output and a logic 0 input to a logic 1 output, and also comprising a two input logical AND gate responsive to the output of said inverter and said second means whereby the output from said aforementioned two input logical AND gate is logic 1 corresponding to a logic 0 input to said inverter and a logic 1 input from said second means and a logic 1 input from said second means and a logic 0 output from said fourth means corresponding to any other condition.

6. The invention set forth in claim 5 further defined in that said video switching means responds to said logic 1 output from said AND gate within said fourth means thereby to provide said control signal.

* * * * *